(No Model.)
N. W. VERNON.
PLOW BOLT HOLDER.
No. 447,706. Patented Mar. 3, 1891.
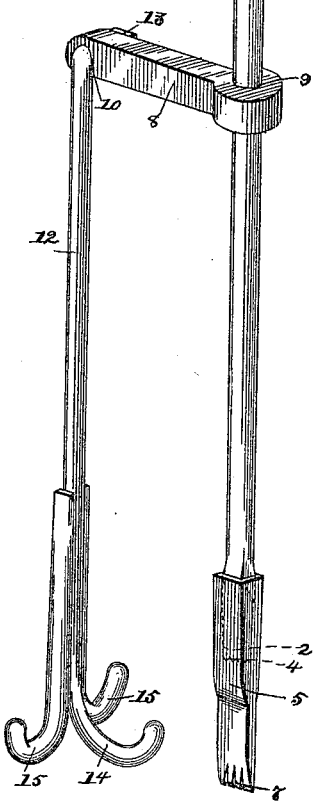
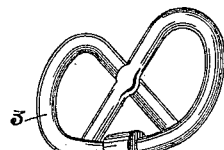
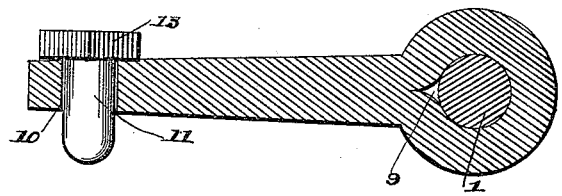
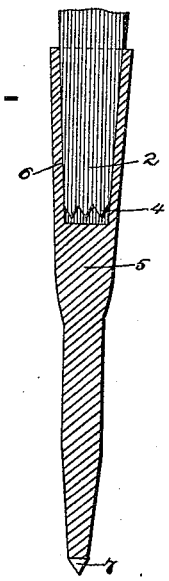
Witnesses
E. S. Duvall Jr.
H. J. Riley
Inventor
Nathan W. Vernon.
By his Attorneys,
C. A. Snow & Co.

UNITED STATES PATENT OFFICE.

NATHAN W. VERNON, OF CORNING, KANSAS, ASSIGNOR OF ONE-HALF TO DAVID HENRY, OF SAME PLACE.

PLOW-BOLT HOLDER.

SPECIFICATION forming part of Letters Patent No. 447,706, dated March 3, 1891.

Application filed December 16, 1890. Serial No. 374,930. (No model.)

*To all whom it may concern:*

Be it known that I, NATHAN W. VERNON, a citizen of the United States, residing at Corning, in the county of Nemaha and State of Kansas, have invented a new and useful Plow-Bolt Holder, of which the following is a specification.

The invention relates to improvements in bolt-holders.

The object of the present invention is to provide a simple and inexpensive device adapted to readily and securely engage the head of a bolt of a plowshare, vehicle, or the like and to prevent the said bolt from turning while a nut is being screwed home or off.

The invention consists in the construction and novel combination and arrangement of parts hereinafter fully described, illustrated in the accompanying drawings, and pointed out in the claims hereto appended.

In the drawings, Figure 1 is a perspective view of a device constructed in accordance with this invention. Fig. 2 is a horizontal sectional view. Fig. 3 is a detail sectional view.

Referring to the accompanying drawings, 1 designates a bar, which is constructed of suitable metal and is preferably round, and is provided at one end with a steel point 2, adapted to engage the head of a bolt and hold the same while a nut is being screwed home or off, and the other end is provided with a handle 3, which facilitates the manipulation of the holder and prevents the bar 1 turning. The end 2 is constructed of cast-steel and is provided with points or teeth 4, and the sides of the end are squared to facilitate the attachment of a supplemental point 5, which is provided with a socket 6 to receive the squared end of the bar 1, and which is provided with a chisel-edge 7 to facilitate engagement of bolts having screw-heads and to put in anti-rattler rubbers.

Mounted upon the bar 1 and adapted to be adjusted thereon is an arm 8, provided at one end with an integral eye 9 to receive the bar 1 and provided at its other end with a perforation 10, through which passes the end 11 of a rod 12. The rod 12 has its end 11 bent at an angle to form a pivot, which is arranged in the perforation 10 and has its end threaded and engaged by a nut 13, and the other end of the rod 12 is bent to form a hook 14 to engage a plowshare or the like and hold the bar 1 into engagement with the head of a bolt, and to enable the bar of a rod 12 to readily engage the body having the bolt, it is provided with hooks 15, arranged at opposite sides of the hook 14 and secured to the rod.

One of the hooks is brought into engagement with a plowshare or other suitable body having a bolt, and the arm is adjusted on the bar to a point which will bring the end 2 into engagement with the head of the bolt, and a slight pressure on the bar will cause the bolt to be securely clamped and held against turning while a nut is being screwed on or off.

The bolt-holder is designed for plows, vehicles, and the like, and readily engages the same and a head of a bolt therein, and is capable of securely holding the bolt while a nut is being screwed.

The arm 8 is designed to be moved along the bar and arranged at various positions to adjust the device to bolts to be operated upon, and the outer end of the arm 8 will sag sufficiently to cause the eye to bight the bar and produce sufficient friction to securely retain the parts at any desired point of adjustment and prevent any slipping of the arm on the bar.

What I claim is—

1. A bolt-holder comprising a bar having one end adapted to engage a bolt, an arm adjustably mounted on the bar, and a rod having one end connected to the arm and its other end adapted to engage a body having the bolt, substantially as described.

2. A bolt-holder comprising the bar 1, the arm adjustably mounted on the bar, and the rod having one end pivoted to the arm and the other end provided with a hook, substantially as described.

3. A bolt-holder comprising the bar 1, the arm provided at one end with an eye to receive the bar and having its other provided with a perforation, and the rod having one end provided with a hook and its other end bent to form a pivot and arranged in the perforations of the arm, substantially as described.

4. A bolt-holder comprising the bar, the arm provided with an eye to receive the bar, and the rod pivoted to the arm and having one end bent to form a hook 14 and provided with hooks 15, arranged on opposite sides of the hook 14, substantially as described.

In testimony that I claim the foregoing as my own I have hereto affixed my signature in presence of two witnesses.

NATHAN W. VERNON.

Witnesses:
    DAVID HENRY,
    HECTOR BACON.